United States Patent
Zhang

(10) Patent No.: US 11,228,720 B2
(45) Date of Patent: Jan. 18, 2022

(54) METHOD FOR IMAGING CONTROLLING, ELECTRONIC DEVICE, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventor: Gong Zhang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/172,765

(22) Filed: Feb. 10, 2021

(65) Prior Publication Data
US 2021/0168275 A1 Jun. 3, 2021

Related U.S. Application Data

(63) Continuation of application No. PCT/CN2019/090555, filed on Jun. 10, 2019.

(30) Foreign Application Priority Data

Aug. 13, 2018 (CN) .......................... 201810916157.7

(51) Int. Cl.
*H04N 5/235* (2006.01)

(52) U.S. Cl.
CPC ......... *H04N 5/2355* (2013.01); *H04N 5/2353* (2013.01); *H04N 5/2354* (2013.01)

(58) Field of Classification Search
CPC .. H04N 5/2355; H04N 5/2353; H04N 5/2354; H04N 5/2351; H04N 9/04557;
(Continued)

(56) References Cited

U.S. PATENT DOCUMENTS

| 7,684,690 B2* | 3/2010 | Lee | ......................... G03B 7/093 |
| | | | 396/213 |
| 10,904,452 B2* | 1/2021 | Choi | ..................... H04N 5/2353 |

(Continued)

FOREIGN PATENT DOCUMENTS

| CN | 101726964 | 6/2010 |
| CN | 102111560 | 6/2011 |

(Continued)

OTHER PUBLICATIONS

WIPO, ISR for PCT/CN2019/090555, Sep. 9, 2019.
(Continued)

*Primary Examiner* — Chiawei Chen
(74) *Attorney, Agent, or Firm* — Hodgson Russ LLP

(57) ABSTRACT

A method for imaging controlling, an electronic device, and a non-transitory computer-readable storage medium are provided. The method includes the following. Determine a same-exposure image ratio according to ambient brightness of a shooting scene, where the same-exposure image ratio is a ratio of the number of images to be captured with same exposure among multiple images to be captured to the number of the multiple images to be captured, and the same-exposure image ratio is inversely proportional to the ambient brightness. Capture the multiple images that satisfy the same-exposure image ratio. Perform a synthesizing processing on the multiple images.

20 Claims, 9 Drawing Sheets

(58) Field of Classification Search
CPC . H04N 5/35554; H04N 5/35545; H04N 9/045
See application file for complete search history.

(56) References Cited

U.S. PATENT DOCUMENTS

| | | | |
|---|---|---|---|
| 2004/0017505 A1 | 1/2004 | Yamauchi | |
| 2009/0226160 A1* | 9/2009 | Jang | G03B 7/087 396/242 |
| 2010/0157078 A1* | 6/2010 | Atanassov | G06T 5/007 348/222.1 |
| 2012/0105690 A1 | 5/2012 | Waqas et al. | |
| 2012/0177352 A1* | 7/2012 | Pillman | H04N 5/2354 396/61 |
| 2012/0194686 A1* | 8/2012 | Lin | H04N 5/2355 348/208.4 |
| 2012/0262600 A1* | 10/2012 | Velarde | H04N 9/735 348/223.1 |
| 2013/0222645 A1* | 8/2013 | Bilcu | H04N 19/162 348/239 |
| 2016/0019681 A1 | 1/2016 | Cheng | |
| 2016/0057333 A1* | 2/2016 | Liu | H04N 5/2355 348/239 |
| 2017/0142312 A1* | 5/2017 | Dal Mutto | H04N 13/239 |
| 2017/0374258 A1* | 12/2017 | Fujita | H04N 5/2355 |

FOREIGN PATENT DOCUMENTS

| | | |
|---|---|---|
| CN | 102316331 | 1/2012 |
| CN | 102761690 | 10/2012 |
| CN | 103581565 | 2/2014 |
| CN | 105227858 | 1/2016 |
| CN | 105306794 | 2/2016 |
| CN | 105578023 | 5/2016 |
| CN | 105791707 | 7/2016 |
| CN | 105827902 | 8/2016 |
| CN | 107087118 | 8/2017 |
| CN | 107509044 | 12/2017 |
| CN | 108040164 | 5/2018 |
| CN | 108322669 | 7/2018 |
| CN | 108391059 | 8/2018 |
| WO | 2017035750 | 3/2017 |

OTHER PUBLICATIONS

SIPO, First Office Action for CN Application No. 201810916157.7, dated Oct. 12, 2019.
SIPO, Notification to Grant Patent Right for Invention for CN Application No. 201810916157.7, dated Apr. 13, 2020.
EPO, Extended European Search Report for European Application No. 19850633.9, dated Sep. 6, 2021.

* cited by examiner

|   | 1 | 2 | 3 | 4 | 5 | 6 | 7 | 8 |
|---|---|---|---|---|---|---|---|---|
| 1 | R (L) | R (M) | G (L) | G (M) | R (L) | R (M) | G (L) | G (M) |
| 2 | R (M) | R (S) | G (M) | G (S) | R (M) | R (S) | G (M) | G (S) |
| 3 | G (L) | G (M) | B (L) | B (M) | G (L) | G (M) | B (L) | B (M) |
| 4 | G (M) | G (S) | B (M) | B (S) | G (M) | G (S) | B (M) | B (S) |
| 5 | R (L) | R (M) | G (L) | G (M) | R (L) | R (M) | G (L) | G (M) |
| 6 | R (M) | R (S) | G (M) | G (S) | R (M) | R (S) | G (M) | G (S) |
| 7 | G (L) | G (M) | B (L) | B (M) | G (L) | G (M) | B (L) | B (M) |
| 8 | G (M) | G (S) | B (M) | B (S) | G (M) | G (S) | B (M) | B (S) |

FIG. 5

MEHTOD FOR IMAGING CONTROLLING, ELECTRONIC DEVICE, AND NON-TRANSITORY COMPUTER-READABLE STORAGE MEDIUM

CROSS-REFERENCE TO RELATED APPLICATION(S)

This application is a continuation of International Application No. PCT/CN2019/090555, filed on Jun. 10, 2019, which claims priority to Chinese Patent Application No. 201810916157.7, filed on Aug. 13, 2018, the entire disclosure of which are incorporated herein by reference.

TECHNICAL FIELD

This disclosure relates to the technical field of electronic devices, and particularly to a method for imaging controlling, an electronic device, and a non-transitory computer-readable storage medium.

BACKGROUND

With continuous development of terminal technology, electronic devices are increasingly used by users to capture images. When a front camera of an electronic device is used by a user to take a selfie, since the user locates between a light source and the electronic device, it is easy to cause insufficient exposure of a face. If brightness of the face is increased by adjusting exposure, a background area is overexposed, and a shooting scene cannot even be displayed clearly.

Generally, in order to improve shooting quality, in a shooting process, a pixel array is controlled to be subjected to long exposure, medium exposure, and short exposure, and images obtained with different exposures are synthesized to output an image, thereby improving an imaging effect of the image.

However, in a relatively dark scene, a dynamic range of an image captured in this way may be relatively low. In a scene having medium brightness, an image captured has relatively large image noises. Therefore, this single shooting mode cannot be applied to multiple shooting scenes.

SUMMARY

In an implementation of the present disclosure, a method for imaging controlling is provided. The method includes the following. Determine a same-exposure image ratio according to ambient brightness of a shooting scene, where the same-exposure image ratio is a ratio of the number of images to be captured with same exposure among multiple images to be captured to the number of the multiple images to be captured, and the same-exposure image ratio is inversely proportional to the ambient brightness. Capture the multiple images that satisfy the same-exposure image ratio. Perform a synthesizing processing on the multiple images.

In another implementation of the present disclosure, an electronic device is provided. The electronic device includes a memory configured to store at least one computer program and a processor. The at least one computer program, when executed, is operable with the processor to perform the following. Determine a same-exposure image ratio according to ambient brightness of a shooting scene, where the same-exposure image ratio is a ratio of the number of images to be captured with same exposure among multiple images to be captured to the number of the multiple images to be captured, and the same-exposure image ratio is inversely proportional to the ambient brightness. Capture the multiple images that satisfy the same-exposure image ratio. Perform a synthesizing processing on the multiple images.

In yet another implementation of the present disclosure, a non-transitory computer-readable storage medium is provided. The storage medium is configured to store at least one computer program. The at least one computer program, when executed, is operable with a processor of an electronic device to perform the following. Determine a same-exposure image ratio according to ambient brightness of a shooting scene, where the same-exposure image ratio is a ratio of the number of images to be captured with same exposure among multiple images to be captured to the number of the multiple images to be captured, and the same-exposure image ratio is inversely proportional to the ambient brightness. Capture the multiple images that satisfy the same-exposure image ratio. Perform a synthesizing processing on the multiple images.

BRIEF DESCRIPTION OF THE DRAWINGS

The above-mentioned and/or additional aspects and advantages of the present disclosure will become apparent and be easily understood according to description of implementations in conjunction with accompanying drawings.

FIG. 5 is a schematic structural diagram illustrating a pixel-unit array of an electronic device according to an implementation of the present disclosure.

DETAILED DESCRIPTION

Figure 1:
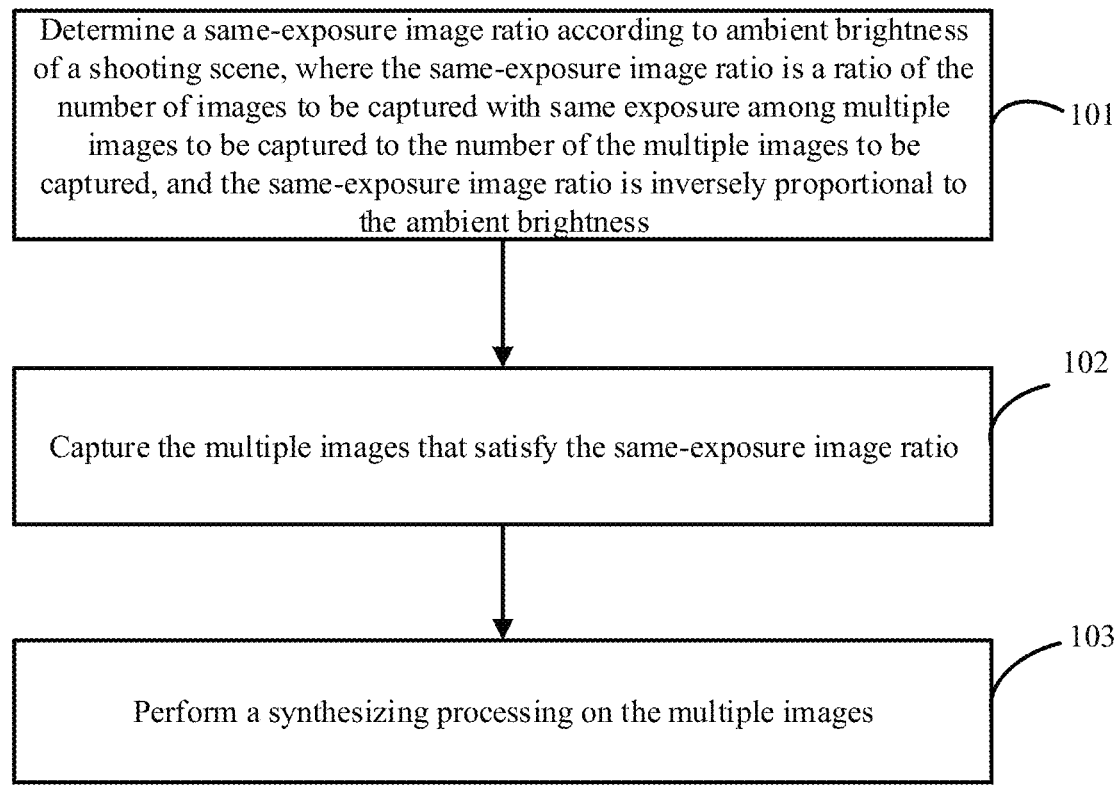
FIG. 1 is a schematic flow chart illustrating a method for imaging controlling according to an implementation of the present disclosure.

The following describes implementations of the present disclosure in detail. Examples of the implementations are illustrated in accompanying drawings, where throughout the specification the same or like reference numerals represent the same or like elements or elements having the same or similar functions. The implementations described below with reference to the accompanying drawings are exemplary and merely intended to explain the disclosure, rather than being understood as a limitation on the present disclosure.

The following will describe a method and device for imaging controlling according to an implementation of the present disclosure with reference to the accompanying drawings.

FIG. 1 is a schematic flow chart illustrating a method for imaging controlling according to an implementation of the present disclosure.

Figure 2:
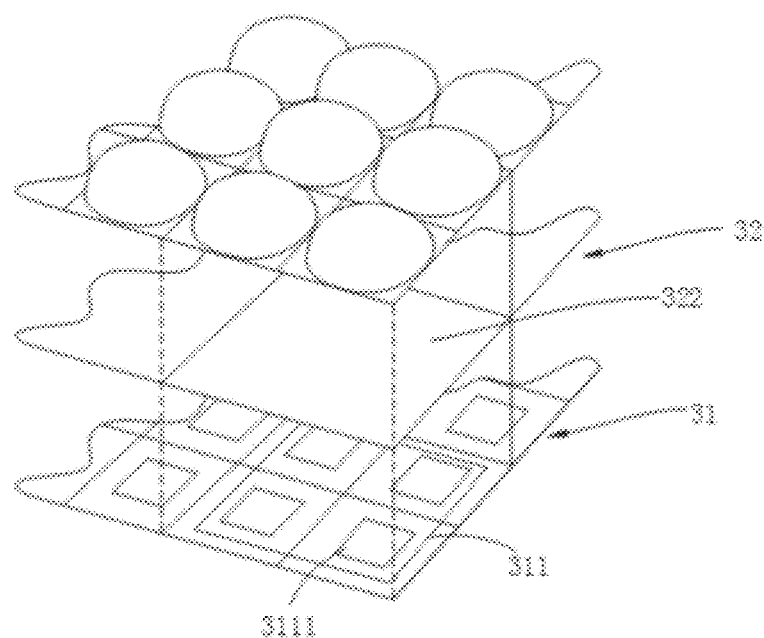
FIG. 2 is a schematic structural diagram illustrating an electronic device according to an implementation of the present disclosure.

The method for imaging controlling in the implementation of the present disclosure is applied to an electronic device. Referring to FIG. 2, an electronic device 30 includes a pixel-unit array 31 and a filter-unit array 32 disposed on the pixel-unit array 31. The pixel-unit array 31 includes multiple photosensitive pixel units 311, and each photosensitive pixel unit 311 includes multiple photosensitive pixels 3111. The filter-unit array 32 includes multiple filter units 322 corresponding to the multiple photosensitive pixel units 311, and each filter unit 322 covers a corresponding photosensitive pixel unit 311. Each photosensitive pixel unit 311 in the pixel-unit array 31 includes at least one long-exposure pixel, at least one medium-exposure pixel, and at least one short-exposure pixel.

The long-exposure pixel refers to one photosensitive pixel exposure time of which is long exposure time, the medium-exposure pixel refers to one photosensitive pixel exposure time of which is medium exposure time, and the short-exposure pixel refers to one photosensitive pixel exposure time of which is short exposure time, where the long exposure time of the long-exposure pixel is longer than the medium exposure time of the medium-exposure pixel, and the medium exposure time of the medium-exposure pixel is longer than the short exposure time of the short-exposure pixel.

When the electronic device operates, the long-exposure pixel, the medium-exposure pixel, and the short-exposure pixel are controlled to be subject to exposure simultaneously, that is, the medium-exposure pixel and the short-exposure pixel are controlled to be subject to exposure during exposure of the long-exposure pixel. In an implementation, the electronic device first controls the long-exposure pixel to be subject to exposure, and then controls the medium-exposure pixel and the short-exposure pixel to be subject to exposure during the exposure of the long-exposure pixel. An end time of the exposure of the medium-exposure pixel and an end time of the exposure of the short-exposure pixel need to be the same as that of the long-exposure pixel or before the end time of the exposure of the long-exposure pixel.

In another implementation, the long-exposure pixel, the medium-exposure pixel, and the short-exposure pixel are controlled to be subject to exposure simultaneously, that is, a starting time of the exposure of the long-exposure pixel, a starting time of the exposure of the medium-exposure pixel, and a starting time of the exposure of the short-exposure pixel are the same. In this way, there is no need to control the pixel-unit array to be subject to long exposure, medium exposure, and short exposure in sequence, and time consumed by capturing images can be reduced.

As illustrated in FIG. 1, the method for imaging controlling includes the following.

At block 101, determine a same-exposure image ratio according to ambient brightness of a shooting scene, where the same-exposure image ratio is a ratio of the number of images to be captured with same exposure among multiple images to be captured to the number of the multiple images to be captured, and the same-exposure image ratio is inversely proportional to the ambient brightness.

In an implementation, an independent light-measurement device can be used to measure the ambient brightness of the shooting scene. In another implementation, an International Organization for Standardization (ISO) value automatically adjusted by a camera of the electronic device can be read, and the ambient brightness of the shooting scene can be determined according to the read ISO value. In yet another implementation, the pixel-unit array can be further controlled to measure the ambient brightness of the shooting scene. There is no limitation on measurement of the ambient brightness of the shooting scene in the present disclosure.

The same-exposure image ratio refers to the ratio of the number of the images to be captured with same exposure among the multiple images to be captured to the number of the multiple images to be captured.

What needs to be illustrated is that the same-exposure image ratio is inversely proportional to the ambient brightness. The higher the ambient brightness, the smaller the same-exposure image ratio, and the lower the ambient brightness, the larger the same-exposure image ratio, until exposures for capturing various images are different from each other. Thus, according to the ambient brightness of the shooting scene, the same-exposure image ratio suitable for the ambient brightness can be determined.

At block 102, capture the multiple images that satisfy the same-exposure image ratio.

In an implementation, after the same-exposure image ratio is determined according to the ambient brightness of the shooting scene, according to the same-exposure image ratio, perform shooting by adopting corresponding exposure to obtain the multiple images, and thus obtain the multiple images that satisfy the same-exposure image ratio. That is, among the multiple images, a ratio of the number of images captured with same exposure to the number of the multiple images is the same-exposure image ratio.

In an implementation, according to the same-exposure image ratio, it is determined that four images need to be captured through the long exposure and one image needs to be captured through the short exposure, and thus four long-exposure images and one short-exposure image are obtained. Different shooting scenes have different ambient brightness, and accordingly same-exposure image ratios corresponding to different shooting scenes are different, that is, for multiple images captured in each shooting scene, the number of images obtained with same exposure is different.

At block 103, perform a synthesizing processing on the multiple images.

In an implementation of the present disclosure, perform the synthesizing processing on the multiple images that satisfy the same-exposure image ratio obtained at block 102, to obtain an image corresponding to the ambient brightness.

In an implementation of the present disclosure, when the ambient brightness is not in a high level, the captured image may have noise. In such a case, a synthesizing and noise-reduction processing needs to be performed on the captured images to obtain an image.

According to the method for imaging controlling in the implementation of the present disclosure, the same-exposure image ratio is determined according to the ambient brightness of the shooting scene. The same-exposure image ratio refers to the ratio of the number of the images to be captured with same exposure among the multiple images to be captured to the number of the multiple images to be captured, and the same-exposure image ratio is inversely proportional to the ambient brightness. The multiple images that satisfy the same-exposure image ratio are captured. The synthesizing processing is performed on the multiple images. Therefore, according to the ambient brightness of the shooting scene, shooting is determined to be performed according to the same-exposure image ratio to obtain the multiple images, and then the multiple mages are synthesized to obtain an image, and thus not only noise of the image is reduced and a dynamic range of the image is improved, but also a relatively good shooting effect is provided and user's experience is improved.

Figure 3:
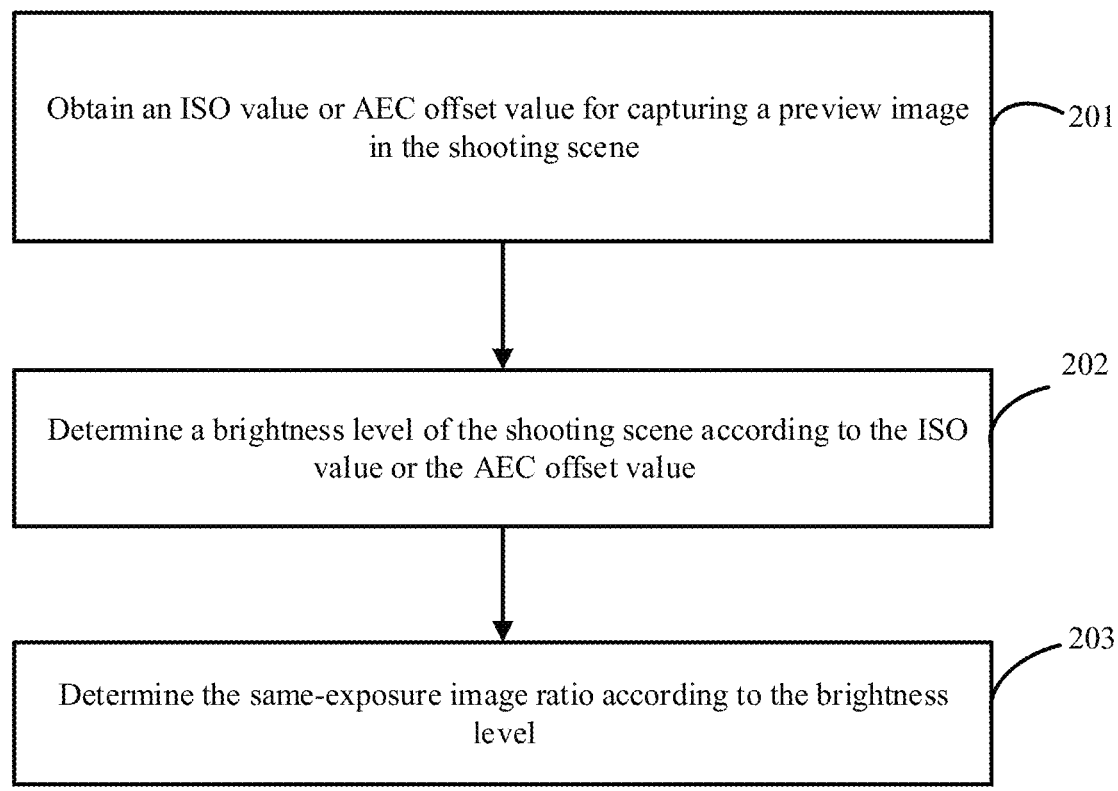
FIG. 3 is a schematic flow chart illustrating a method for determining, according to ambient brightness, a same-exposure image ratio according to an implementation of the present disclosure.

In an implementation, as illustrated in FIG. 3, on the basis of the implementation illustrated in FIG. 1, the operation at block 101 can include the following.

At block 201, obtain an ISO value or automatic exposure control (AEC) offset value for capturing a preview image in the shooting scene.

In an implementation of the present disclosure, the ISO value for capturing the preview image in the shooting scene can be obtained by reading the ISO value automatically adjusted by the camera.

What needs to be illustrated is that the ISO value is indicative of light sensitivity of the camera. ISO values commonly used are 50, 100, 200, 400, 1000, and so on. The camera can automatically adjust the ISO value according to the ambient brightness.

When the electronic device is used to capture images, the AEC offset value can also be automatically adjusted according to the ambient brightness, and thus the AEC offset value for capturing the preview image in the shooting scene can be obtained by reading an AEC offset value automatically adjusted by the camera.

At block 202, determine a brightness level of the shooting scene according to the ISO value or the AEC offset value.

In an implementation of the present disclosure, the ambient brightness can be divided into three brightness levels according to the ISO value or the AEC offset value, where the three brightness levels are respectively be a low brightness level, a medium brightness level, and a high brightness level. Brightness corresponding to the low brightness level is lower than that corresponding to the medium brightness level, and the brightness level corresponding to the medium brightness level is lower than that corresponding to the high brightness level.

In an implementation of the present disclosure, since the camera can automatically adjust the ISO value according to the ambient brightness, the ambient brightness of the shooting scene can be deduced according to the obtained ISO value. The larger the ISO value, the lower the ambient brightness, and the smaller the ISO value, the higher the ambient brightness. In a scene with sufficient lights, the ISO value may be 50 or 100, and in a scene with insufficient lights, the ISO may be 400 or larger than 400.

In an implementation, since the camera can automatically adjust the AEC offset value according to the ambient brightness, the ambient brightness of the shooting scene can be deduced according to the obtained AEC offset value. The AEC offset value may be EV-2, EV0, EV2, EV4, EV8, or other. The AEC offset value is inversely proportional to the brightness level. The larger the AEC offset value, the darker the shooting scene, and the smaller the AEC offset value, the brighter the shooting scene.

At block 203, determine the same-exposure image ratio according to the brightness level.

Since the same-exposure image ratio is inversely proportional to the ambient brightness, and thus the same-exposure image ratio can be determined according to the brightness level of the shooting scene.

In an implementation, if the brightness level of the shooting scene is the high brightness level, it is determined that the same-exposure image ratio is smaller than or equal to a first ratio predetermined. If the brightness level of the shooting scene is the low brightness level, it is determined that the same-exposure image ratio is larger than or equal to a second ratio predetermined. If the brightness level of the shooting scene is the medium brightness level, it is determined that the same-exposure image ratio is smaller than the second ratio and larger than the first ratio.

The first ratio is determined according to a same-exposure image ratio that is for a condition in which exposures for capturing the multiple images are different from each other. The second ratio is determined according to a same-exposure image ratio that is for a condition in which among the multiple images exposure for capturing at least one image is different from exposures for capturing the remaining images. The first ratio is smaller than the second ratio.

According to the method for imaging controlling in the implementation of the present disclosure, the ISO value or the AEC offset value for capturing the preview image in the shooting scene is obtained. According to the ISO value or the AEC offset value, the brightness level of the shooting scene is determined. According to the brightness level, the same-exposure image ratio is determined. Therefore, according to the brightness level of the shooting scene, a corresponding same-exposure image ratio is determined. By means of adopting different exposures in different scenes having different ambient brightness to perform shooting, not only noise of an image is reduced and a dynamic range of the image is improved, but also a relatively good shooting effect can be provided and user's experience can be improved.

Figure 4:
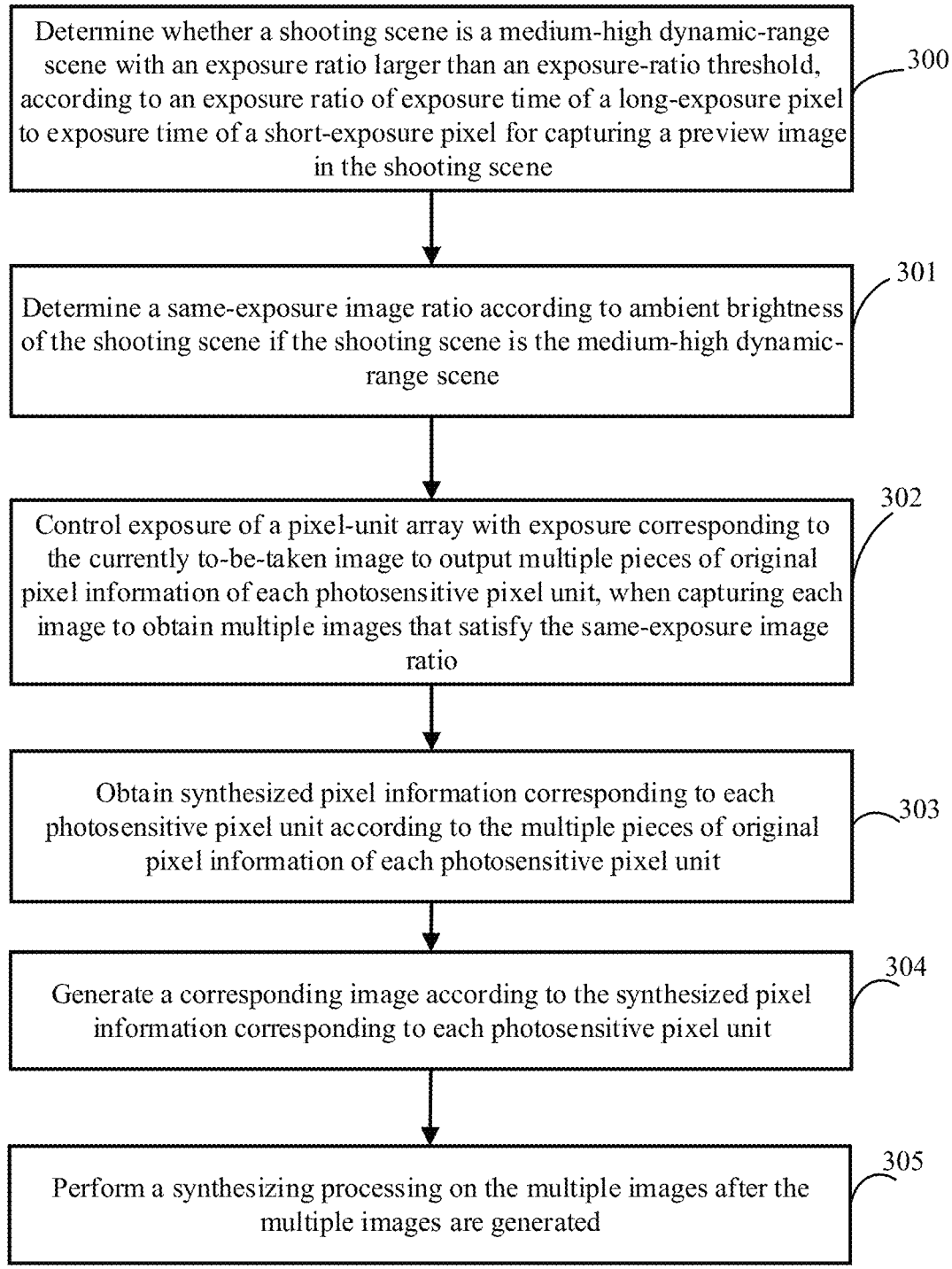
FIG. 4 is a schematic flow chart illustrating a method for imaging controlling according to another implementation of the present disclosure.

As illustrated in FIG. 4, a method for image controlling according to another implementation of the present disclosure is provided. The method includes the following.

At block 300, determine whether the shooting scene is a medium-high dynamic-range scene with an exposure ratio larger than an exposure-ratio threshold, according to an exposure ratio of exposure time of the long-exposure pixel to exposure time of the short-exposure pixel used for capturing a preview image in the shooting scene.

In an implementation, when the electronic device captures the preview image in the shooting scene, the long-exposure pixel and the short-exposure pixel in each photosensitive pixel unit of the electronic device are determined, and then the exposure ratio of the exposure time of the long-exposure pixel to the exposure time of the short-exposure pixel is calculated. If the exposure ratio of the exposure time of the long-exposure pixel to the exposure time of the short-exposure pixel is larger than the exposure-ratio threshold, it is determined that the current shooting scene is the medium-high dynamic-range scene.

The exposure-ratio threshold refers to a preset threshold for determining a dynamic range of the shooting scene according to the exposure ratio of the exposure time of the long-exposure pixel to the exposure time of the short-exposure pixel. If the exposure ratio corresponding to the shooting scene is larger than the exposure-ratio threshold, it is determined that the shooting scene is the medium-high dynamic-range scene. If the exposure ratio corresponding to the shooting scene is smaller than the exposure-ratio threshold, it is determined that the shooting scene is a low-dynamic-range scene.

At block 301, determine the same-exposure image ratio according to the ambient brightness of the shooting scene if the shooting scene is the medium-high dynamic-range scene. For the detailed manner of determining the same-exposure image ratio according to the ambient brightness of the shooting scene, reference can be made to the method illustrated in FIG. 3, which will not be repeated herein.

At block 302, when capturing each image to obtain the multiple images that satisfy the same-exposure image ratio, control exposure of the pixel-unit array with exposure corresponding to the currently to-be-captured image to output multiple pieces of original pixel information of each photosensitive pixel unit, where the multiple pieces of original pixel information of each photosensitive pixel unit include original pixel information of the long-exposure pixel in each photosensitive pixel unit, the original pixel information of the medium-exposure pixel in each photosensitive pixel unit, and the original pixel information of the short-exposure pixel in each photosensitive pixel unit.

In the implementation, when the shooting scene is the medium-high dynamic-range scene, an image acquired by a single shot of the electronic device may have a large overexposure part or a very dark part. Therefore, it needs to capture multiple images. When capturing each image to obtain the multiple images, control exposure of the pixel-unit array with the exposure corresponding to the currently to-be-captured image. After exposure, for each photosensitive pixel unit, original pixel information of the long-exposure pixel, original pixel information of the short-exposure pixel, and original pixel information of the medium-exposure pixel are obtained.

In an implementation, for multiple executions of controlling the exposure of the pixel-unit array with the exposure corresponding to the currently to-be-captured image to output corresponding original pixel information, multiple kinds of exposure time are adopted, where the multiple kinds of exposure time may be the same or different.

In an implementation, the multiple kinds of exposure time adopted by the electronic device to obtain the original pixel information of the pixel-unit array include at least two kinds of exposure time that are the same.

In an implementation, when the electronic device controls, with the exposure time corresponding to the currently to-be-captured image, the exposure of the pixel-unit array to obtain each of the multiple images, the multiple kinds of exposure time adopted by multiple exposures (each exposure is to obtain the original pixel information) are different from each other.

In another implementation, when the electronic device controls, with the exposure time corresponding to the currently to-be-captured image, the exposure of the pixel-unit array to obtain each of the multiple images, the multiple kinds of exposure time adopted by multiple exposures (each exposure is to obtain the original pixel information) may include several kinds of exposure time that are the same and one kind of overlong exposure time.

In an implementation, if the shooting scene is relatively bright, different kinds of exposure time can be adopted by the electronic device to obtain the original pixel information of the pixel-unit array. The electronic device first controls the long-exposure pixel to be subject to exposure, and then controls the medium-exposure pixel and the short-exposure pixel to be subject to exposure during the exposure of the long-exposure pixel. The end time of the exposure of the medium-exposure pixel and the end time of the exposure of the short-exposure pixel need to be the same as that of the long-exposure pixel or before the end time of the exposure of the long-exposure pixel. In another implementation, the long-exposure pixel, the medium-exposure pixel, and the short-exposure pixel are controlled to be subject to exposure simultaneously, that is, the starting time of the exposure of the long-exposure pixel, the starting time of the exposure of the medium-exposure pixel, and the starting time of the exposure of the short-exposure pixel are the same. In this way, control the pixel-unit array to output multiple pieces of original pixel information obtained with different kinds of exposure time, without controlling the pixel-unit array to be subject to the long exposure, the medium exposure, and the short exposure in sequence.

The long-exposure pixel refers to one photosensitive pixel the exposure time of which is the long exposure time, the medium-exposure pixel refers to one photosensitive pixel the exposure time of which is the medium exposure time, and the short-exposure pixel refers to one photosensitive pixel the exposure time of which is the short exposure time, where the long exposure time of the long-exposure pixel is longer than the medium exposure time of the medium-exposure pixel, and the medium exposure time of the medium-exposure pixel is longer than the short exposure time of the short-exposure pixel.

At block 303, obtain synthesized pixel information corresponding to each photosensitive pixel unit according to the multiple pieces of original pixel information of each photosensitive pixel unit.

In an implementation, each time the original pixel information of the pixel-unit array is output, for each photosensitive pixel unit, obtain the synthesized pixel information corresponding to the photosensitive pixel unit by calculating an average value of the original pixel information of the long-exposure pixel, the original pixel information of the medium-exposure pixel, and the original pixel information of the short-exposure pixel. Furthermore, each photosensitive pixel unit corresponds to one piece of synthesized pixel information.

As an example, take the red photosensitive pixel unit illustrated in FIG. 5 as an example, R(1,1) refers to the long-exposure pixel, R(1,2) and R(2,1) refer to the medium-exposure pixels, and R(2,2) refer to the short-exposure pixel. A processor of the electronic device first controls the long-exposure pixel R(1,1), the medium-exposure pixels R(1,2) and R(2,1), and the short-exposure pixel R(2,2) to be subject to exposure simultaneously. After the exposure, the red photosensitive pixel unit outputs four pieces of original pixel information, namely original pixel information of the long-exposure pixel R(1,1), original pixel information of the medium-exposure pixel R(1,2), original pixel information of the medium-exposure pixel R(2,1), and original pixel information of the short-exposure pixel R(2,2). In this way, the processor of the electronic device controls all the photosensitive pixels in each photosensitive pixel unit to be subject to exposure simultaneously, and obtains multiple pieces of original pixel information of each photosensitive pixel unit.

Further, the processor of the electronic device performs a synthesizing calculation on the multiple pieces of original pixel information of each photosensitive pixel unit, such that multiple pieces of synthesized pixel information are obtained. The synthesized pixel information corresponding to each photosensitive pixel unit is calculated with the following:

$$\frac{[R(1,1) + R(2,1)] + [R(1,2) + R(2,2)]}{2}.$$

In this way, the processor of the electronic device can calculate the synthesized pixel information corresponding to each photosensitive pixel unit in the pixel-unit array.

At block 304, generate a corresponding image according to the synthesized pixel information corresponding to each photosensitive pixel unit.

In an implementation, perform an interpolation calculation on the synthesized pixel information corresponding to each photosensitive pixel unit to generate a corresponding image. Similarly, a corresponding image can be generated according to multiple pieces of synthesized pixel information of multiple photosensitive pixel units in the pixel-unit array.

At block 305, perform the synthesizing processing on the multiple images after the multiple images are generated.

According to the method for imaging controlling in the implementation of the present disclosure, according to the exposure ratio of the exposure time of the long-exposure pixel to the exposure time of the short-exposure pixel used for capturing the preview image in the shooting scene, the shooting scene is determined to be the medium-high dynamic-range scene with the exposure ratio larger than the exposure-ratio threshold. When capturing each image to obtain the multiple images, control the exposure of the pixel-unit array with the exposure corresponding to the currently to-be-captured image to output the original pixel information of each photosensitive-pixel unit. Obtain the synthesized pixel information corresponding to each photosensitive pixel unit according to the original pixel information of the long-exposure pixel in each photosensitive pixel unit, the original pixel information of the medium-exposure pixel in each photosensitive pixel unit, and the original pixel information of the short-exposure pixel in each photosensitive pixel unit, and generate a corresponding image according to the synthesized pixel information corresponding to each photosensitive pixel unit. When the electronic device captures each image to obtain the multiple images, the electronic device controls the exposure of the pixel-unit array with the exposure corresponding to the currently to-be-captured image, to output the multiple pieces of original pixel information of each photosensitive pixel unit. The multiple pieces of original pixel information are synthesized to output a medium-high dynamic-range image, thereby improving imaging effect, image quality, and user's shooting experience.

Figure 6:
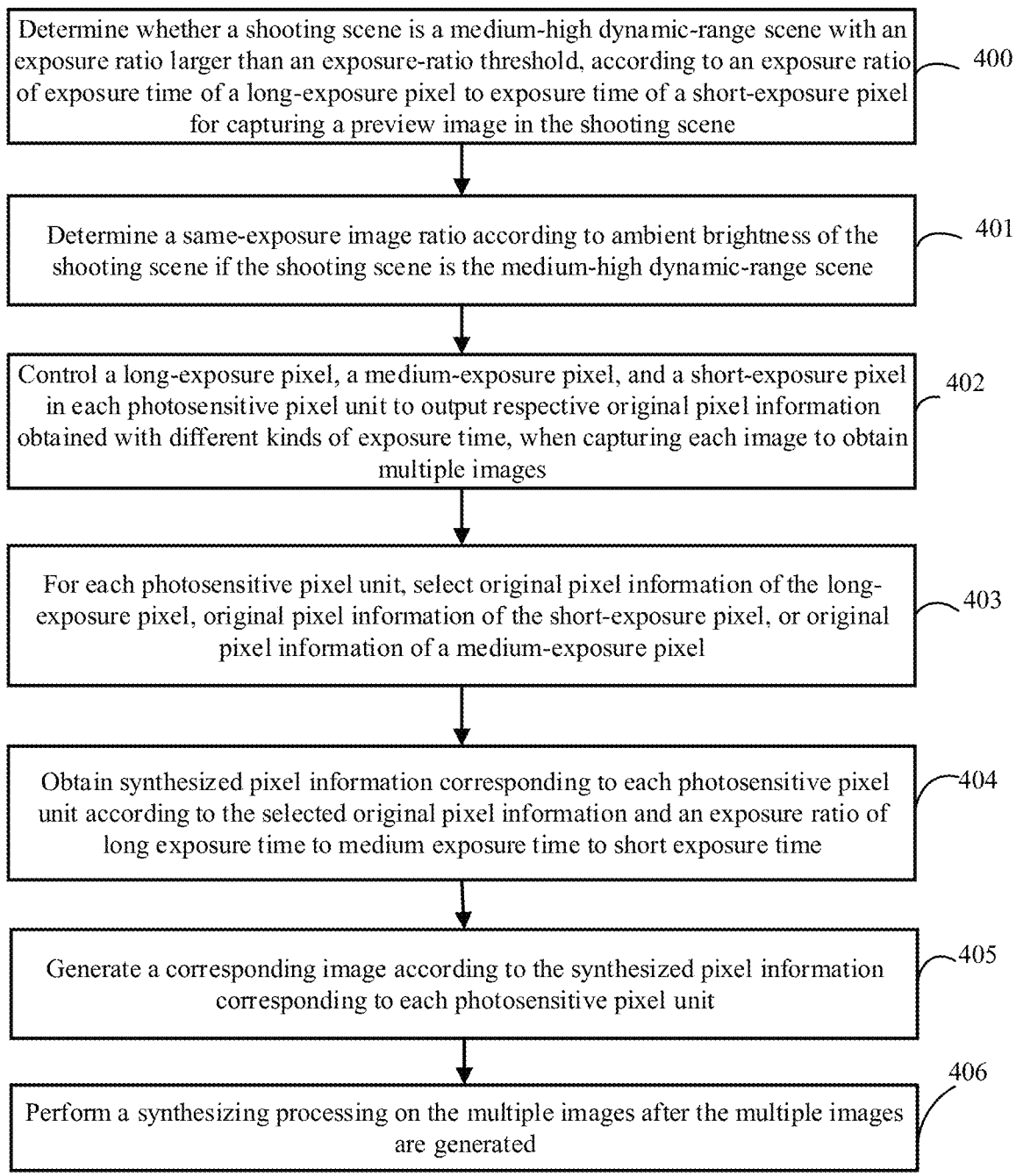
FIG. 6 is a schematic flow chart illustrating a method for imaging controlling according to yet another implementation of the present disclosure.

As illustrated in FIG. 6, a method for imaging controlling according to another implementation of the present disclosure is provided. The method includes the following.

At block 400, if the ambient brightness of the shooting scene is in the high brightness level, determine whether the shooting scene is the medium-high dynamic-range scene with the exposure ratio larger than the exposure-ratio threshold, according to the exposure ratio of the exposure time of the long-exposure pixel to the exposure time of the short-exposure pixel used for capturing the preview image in the shooting scene.

In the implementation, for the manner of determining that the shooting scene is the medium-high dynamic-range scene, reference can be made to the description at block 300 in the above-mentioned implementation, which will not be repeated herein.

At block 401, determine the same-exposure image ratio according to the ambient brightness of the shooting scene if the shooting scene is the medium-high dynamic-range scene. For the detailed manner of determining the same-exposure image ratio according to the ambient brightness of the shooting scene, reference can be made to the method illustrated in FIG. 3, which will not be repeated herein.

At block 402, when capturing each image to obtain the multiple images that satisfy the same-exposure image ratio, the electronic device controls the long-exposure pixel, the medium-exposure pixel, and the short-exposure pixel in each photosensitive pixel unit to output respective original pixel information obtained with different kinds of exposure time.

In an implementation, when the shooting scene is determined to be the medium-high dynamic-range scene, the electronic device first controls the long-exposure pixel to be subject to exposure, and then controls the medium-exposure pixel and the short-exposure pixel to be subject to exposure during the exposure of the long-exposure pixel. The end time of the exposure of the medium-exposure pixel and the end time of the exposure of the short-exposure pixel need to be the same as that of the long-exposure pixel or before the end time of the exposure of the long-exposure pixel. In another implementation, the long-exposure pixel, the medium-exposure pixel, and the short-exposure pixel are controlled to be subject to exposure simultaneously, that is, the starting time of the exposure of the long-exposure pixel, the starting time of the exposure of the medium-exposure pixel, and the starting time of the exposure of the short-exposure pixel are the same. In this way, control the pixel-unit array to output multiple pieces of original pixel information obtained with different kinds of exposure time, without controlling the pixel-unit array to be subject to the long exposure, the medium exposure, and the short exposure in sequence.

The long-exposure pixel refers to one photosensitive pixel exposure time of which is the long exposure time, the medium-exposure pixel refers to one photosensitive pixel exposure time of which is the medium exposure time, and the short-exposure pixel refers to one photosensitive pixel exposure time of which is the short exposure time, where the long exposure time of the long-exposure pixel is longer than the medium exposure time of the medium-exposure pixel, and the medium exposure time of the medium-exposure pixel is longer than the short exposure time of the short-exposure pixel.

At block 403, for each photosensitive pixel unit, select the original pixel information of the long-exposure pixel, the original pixel information of the short-exposure pixel, or the original pixel information of the medium-exposure pixel.

Since each photosensitive pixel unit includes the at least one long-exposure pixel, the at least one medium-exposure pixel, and the at least one short-exposure pixel, select the original pixel information of the long-exposure pixel, the original pixel information of the short-exposure pixel, or the original pixel information of the medium-exposure pixel as original pixel information.

As an example, each photosensitive pixel unit includes one long-exposure pixel, two medium-exposure pixels, and one short-exposure pixel. The original pixel information of the long-exposure pixel is 80, the original pixel information of the short-exposure pixel is 255, and the original pixel information of each medium-exposure pixel is also 255. Since an upper limit of the original pixel information is 255, it means that the original pixel information of the medium-exposure pixel and the original pixel information of the short-exposure pixel are both overexposure pixel information, and thus the original pixel information (80) of the long-exposure pixel can be selected.

At block 404, obtain synthesized pixel information corresponding to each photosensitive pixel unit according to the selected original pixel information and an exposure ratio of the long exposure time to the medium exposure time to the short exposure time.

In an implementation, for each photosensitive pixel unit, according to the selected original pixel information, i.e., the original pixel information of the long-exposure pixel, the original pixel information of the short-exposure pixel, or the original pixel information of the medium-exposure pixel, as well as the exposure ratio of the long exposure time to the medium exposure time to the short exposure time, the synthesized pixel information can be calculated. For example, different weights can be assigned to the three pieces of original pixel information obtained with three different kinds of exposure time, and then the selected original pixel information is multiplied by a corresponding weight to obtain the synthesized pixel information corresponding to the photosensitive pixel unit.

Still taking the above as an example, assuming that the exposure ratio of the long exposure time to the medium exposure time to the short exposure time is 16:4:1, the synthesized pixel information is 1280 obtained by 80*16.

At block 405, generate a corresponding image according to the synthesized pixel information corresponding to each photosensitive pixel unit.

In an implementation, according to the synthesized pixel information corresponding to each photosensitive pixel unit in the pixel-unit array obtained at block 404, the electronic device can output a medium-high dynamic-range image. In such as case, the output image has a relatively good imaging effect.

At block 406, perform the synthesizing processing on the multiple images after the multiple images are generated.

According to the method for imaging controlling in the implementation of the present disclosure, according to the exposure ratio of the exposure time of the long-exposure pixel to the exposure time of the short-exposure pixel used for capturing the preview image in the shooting scene, the shooting scene is determined to be the medium-high dynamic-range scene with the exposure ratio larger than the exposure-ratio threshold. If the exposure ratio is larger than the exposure-ratio threshold, control the pixel-unit array to output multiple pieces of original pixel information obtained with different kinds of exposure time. For each photosensitive pixel unit, select the original pixel information of the long-exposure pixel, the original pixel information of the short-exposure pixel, or the original pixel information of the medium-exposure pixel, and obtain the synthesized pixel information according to the selected original pixel information and the exposure ratio of the long exposure time to the medium exposure time to the short exposure time. Therefore, by controlling the pixel-unit array to output original pixel information obtained with different kinds of exposure time and synthesizing the original pixel information to output an image, in the medium-high dynamic-range scene an image having a relatively high dynamic range can be obtained, which improves an imaging effect, image quality, and user's shooting experience.

In an implementation, if the shooting scene is determined to be the medium-high dynamic-range scene and the brightness level of the shooting scene is determined to be the medium brightness level, a relatively good imaging effect cannot be achieved by a single shot. Therefore, the electronic device executes, at least two times, the operation of controlling the pixel-unit array to output multiple pieces of original pixel information obtained with different kinds of exposure time.

In an implementation, for each photosensitive pixel unit, according to the selected original pixel information, i.e., the original pixel information of the long-exposure pixel, the original pixel information of the short-exposure pixel, or the original pixel information of the medium-exposure pixel, as well as the exposure ratio of the long exposure time to the medium exposure time to the short exposure time, the synthesized pixel information can be calculated. For example, different weights can be assigned to the three pieces of original pixel information obtained with three different kinds of exposure time, and then the selected original pixel information is multiplied by a corresponding weight to obtain the synthesized pixel information corresponding to the photosensitive pixel unit. For the detailed calculation process, reference can be made to the description at blocks 403 and 404 in the above-mentioned implementation, which will not be repeated herein.

If the shooting scene is relatively dark, each time the electronic device obtains the synthesized pixel information corresponding to each photosensitive pixel unit, a corresponding image is generated, and then perform a synthesizing processing on at least two images generated by at least two executions to obtain a synthesized image. The processor of the electronic device performs a noise-reduction processing on the synthesized image to obtain a low-noise image. The image obtained by performing the synthesizing and noise-reduction processing (i.e., the low-noise image) is output. In this case, an image obtained in the medium-high dynamic-range scene has relatively low noise.

Figure 7:
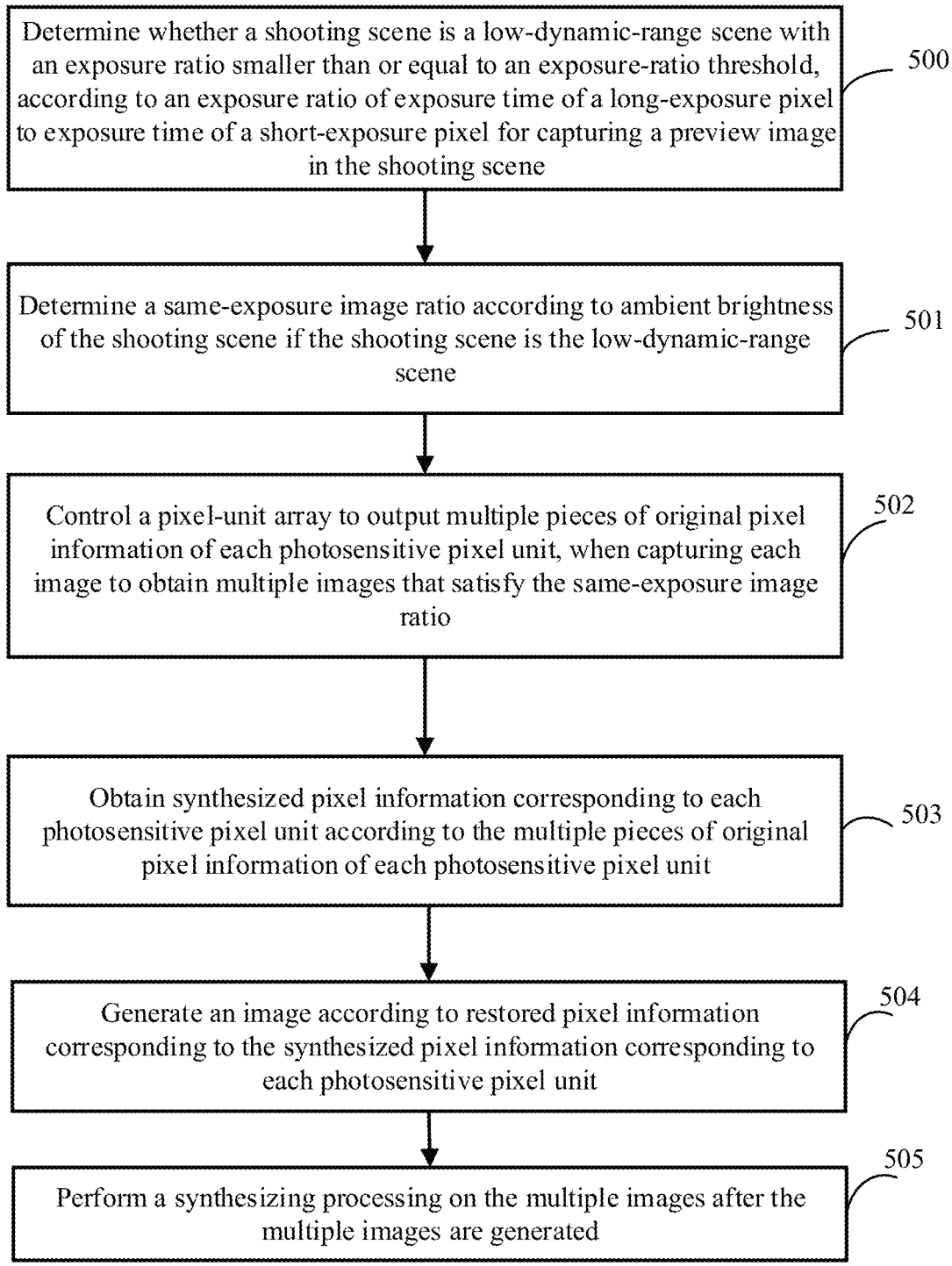
FIG. 7 is a schematic flow chart illustrating a method for imaging controlling according to yet another implementation of the present disclosure.

In the above-mentioned implementation the shooting scene is the medium-high dynamic-range scene with the exposure ratio larger than the exposure-ratio threshold. As illustrated in FIG. 7, if the shooting scene is a low-dynamic-range scene with an exposure ratio smaller than or equal to the exposure-ratio threshold, the method for imaging controlling includes the following.

At block 500, determine whether the shooting scene is the low-dynamic-range scene with the exposure ratio smaller than or equal to the exposure-ratio threshold, according to the exposure ratio of the exposure time of the long-exposure pixel to the exposure time of the short-exposure pixel used for capturing the preview image in the shooting scene.

In the implementation of the present disclosure, for a manner of determining the exposure ratio of the exposure time of the long-exposure pixel to the exposure time of the short-exposure pixel, reference can be made to the description at block 300 in the above-mentioned implementation, which will not be repeated herein. If the exposure ratio of the exposure time of the long-exposure pixel to the exposure time of the short-exposure pixel used for capturing the preview image in the shooting scene is equal to or smaller than the exposure-ratio threshold, the shooting scene is determined to be the low-dynamic-range scene.

At block 501, determine the same-exposure image ratio according to the ambient brightness of the shooting scene if the shooting scene is the low-dynamic-range scene. For the detailed manner of determining the same-exposure image ratio according to the ambient brightness of the shooting scene, reference can be made to the method illustrated in FIG. 3, which will not be repeated herein.

At block 502, when capturing each image to obtain multiple images that satisfy the same-exposure image ratio, control the pixel-unit array to output multiple pieces of original pixel information of each photosensitive pixel unit, where the multiple pieces of original pixel information of each photosensitive pixel unit include original pixel information of the long-exposure pixel in each photosensitive pixel unit, the original pixel information of the medium-exposure pixel in each photosensitive pixel unit, and the original pixel information of the short-exposure pixel in each photosensitive pixel unit.

If the shooting scene is determined to be the low-dynamic-range scene according to the exposure ratio of the exposure time of the long-exposure pixel to the exposure time of the short-exposure pixel, control the pixel-unit array to output the original pixel information.

In an implementation of the present disclosure, the pixel-unit array includes multiple photosensitive pixel units, and each photosensitive pixel unit includes the at least one long-exposure pixel, the at least one medium-exposure pixel, and the at least one short-exposure pixel. Therefore, the original pixel information output by the pixel-unit array includes the original pixel information of the long-exposure pixel, the original pixel information of the medium-exposure pixel, and the original pixel information of the short-exposure pixel.

As an example, as illustrated in FIG. 5, each photosensitive pixel unit 311 in the pixel-unit array 31 of the electronic device includes four photosensitive pixels 3111, and the four photosensitive pixels 3111 are arranged in a 2*2 array. The four photosensitive pixels 3111 in each photosensitive pixel unit 311 are respectively one long-exposure pixel, two medium-exposure pixels, and one short-exposure pixel. In this case, the original pixel information output by the pixel-unit array 31 includes original pixel information of the one long-exposure pixel, original pixel information of the two medium-exposure pixels, and original pixel information of the one short-exposure pixel. Of course, in other implementations, the number of the long-exposure pixel(s), the medium-exposure pixel(s), and the short-exposure pixel(s) in each photosensitive pixel unit 311 can also be other values.

At block 503, obtain synthesized pixel information corresponding to each photosensitive pixel unit according to the multiple pieces of original pixel information of each photosensitive pixel unit.

After the exposure, each photosensitive-pixel unit 311 outputs four pieces of original pixel information. Take the red photosensitive pixel unit 311 illustrated in FIG. 5 as an example, the four pieces of original pixel information include the original pixel information of the long-exposure pixel R(1,1), the original pixel information of the medium-exposure pixel R(1,2), the original pixel information of the medium-exposure pixel R(2,1), and the original pixel information of the short-exposure pixel R(2,2). The processor of the electronic device controls all the photosensitive pixels 3111 in each photosensitive pixel unit to be subject to exposure simultaneously in the above-mentioned manner, and obtains multiple pieces of original pixel information of each photosensitive pixel unit. The processor then obtains multiple pieces of synthesized pixel information according to original pixel information of each photosensitive pixel unit 311 obtained with same exposure time.

In an implementation, take the red photosensitive pixel unit 311 illustrated in FIG. 5 as an example, in a case, if the photosensitive pixels 3111 in the photosensitive pixel unit 311 are arranged in an array 2*2, the original pixel information of the long-exposure pixel R(1, 1) is synthesized pixel information corresponding to the long exposure, a sum of the original pixel information of the medium-exposure pixel R(1, 2) and the original pixel information of the medium-exposure pixel R(2, 1) is synthesized pixel information corresponding to the medium exposure, and the original pixel information of the short-exposure pixel R(2, 2) is synthesized pixel information corresponding to the short exposure.

In another case, if the photosensitive pixels 3111 in the photosensitive pixel unit 311 are arranged in an array 2*4, and there are two long-exposure pixels, four medium-exposure pixels, and two short-exposure pixels, a sum of the original pixel information of the two long-exposure pixels is synthesized pixel information corresponding to the long exposure, a sum of the original pixel information of the four medium-exposure pixels is synthesized pixel information corresponding to the medium exposure, and a sum of the original pixel information of the two short-exposure pixels is synthesized pixel information corresponding to the short exposure.

Figure 8:
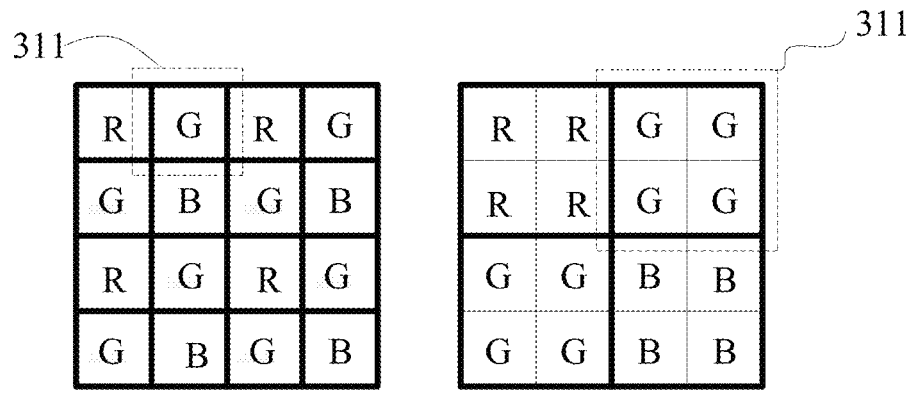
FIG. 8 is a schematic structural diagram illustrating a photosensitive pixel unit of an electronic device according to an implementation of the present disclosure.

As an example, as illustrated in FIG. 8, an arrangement of the multiple pieces of original pixel information of the photosensitive pixel unit 311 is illustrated in the right side of FIG. 8. A size of each photosensitive pixel is 1.0 μm, and the photosensitive pixels are arranged in the form of RRRR/GGGG/BBBB. The photosensitive pixel unit 311 formed by a combination of four photosensitive pixels illustrated in the right side of FIG. 8 is illustrated in the left side of FIG. 8. The combined photosensitive pixel units 311 are arranged in the sequence of GRBG. The combined photosensitive pixel unit 311 is a large pixel of 2.0 μm. This process uses pixel four-in-one technology. The larger the pixels, the more the incident light, and the clear the captured images.

At bock 504, generate an image according to restored pixel information corresponding to the synthesized pixel information corresponding to each photosensitive pixel unit.

If the shooting scene is determined to be the bright environment with sufficient light, a resolution effect caused by high pixels is relatively obvious. Therefore, for each piece of synthesized pixel information, at least two pieces of corresponding restored pixel information are determined. One piece of synthesized pixel information corresponds to one color, and at least two pieces of restored pixel information determined by each piece of synthesized pixel information correspond to at least two colors. For example, synthesized pixel information corresponding to a photosensitive pixel unit 311 illustrated in the left side of FIG. 8 is restored to three pieces of restored pixel information corresponding to three colors. For example, each large pixel of 2.0 μm illustrated in the left side of FIG. 8 can be restored to be four pixels of 1.0 μm arranged in the sequence of GRBG. Finally, perform the image output according to each piece of restored pixel information. In such a case, a relatively clear image can be output.

At block 505, perform the synthesizing processing on the multiple images after the multiple images are generated.

According to the method for imaging controlling in the implementation of the present disclosure, according to the exposure ratio of the exposure time of the long-exposure pixel to the exposure time of the short-exposure pixel used for capturing the preview image in the shooting scene, determine that the shooting scene is the low-dynamic-range scene with the exposure ratio smaller than or equal to the exposure-ratio threshold. If the shooting scene is determined to be the low-dynamic-range scene, control the pixel-unit array to output the original pixel information. Obtain the synthesized pixel information corresponding to each photosensitive pixel unit according to the original pixel information of the long-exposure pixel in each photosensitive pixel unit, the original pixel information of the medium-exposure pixel in each photosensitive pixel unit, and the original pixel information of the short-exposure pixel in each photosensitive pixel unit, and perform imaging according to the restored pixel information corresponding to the synthesized pixel information corresponding to each photosensitive pixel unit. Therefore, if the shooting scene is the low-dynamic-range scene, perform imaging according to the restored pixel information corresponding to the synthesized pixel information corresponding to each photosensitive pixel unit, thereby improving imaging effect, imaging quality, and user's shooting experience.

To realize the above implementations, the present disclosure further provides a device for imaging controlling.

Figure 9:
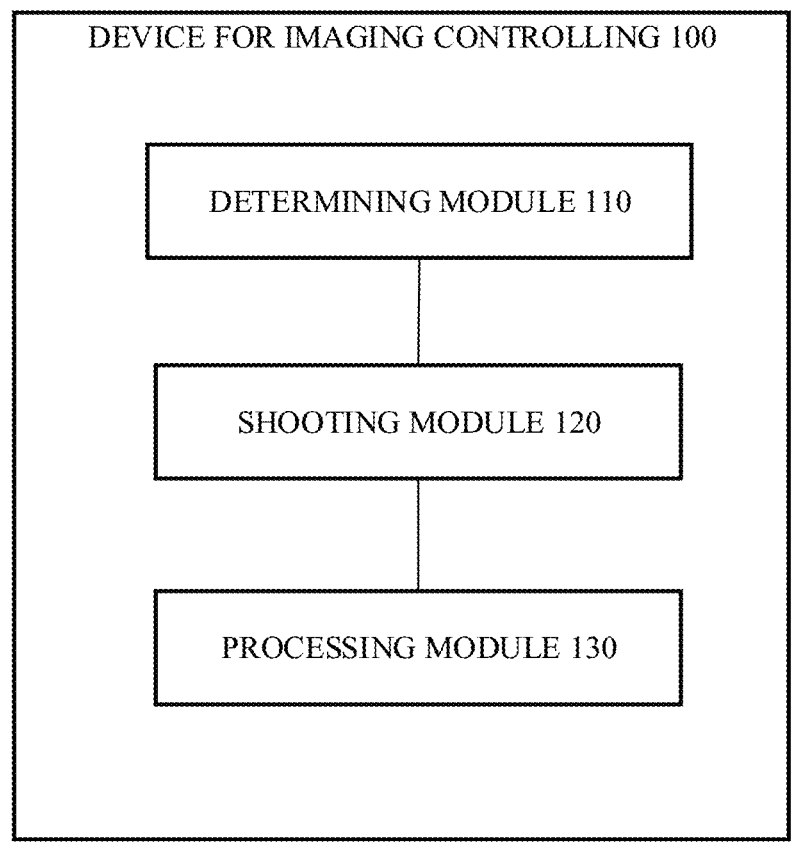
FIG. 9 is a schematic structural diagram illustrating a device for imaging controlling according to an implementation of the present disclosure.

FIG. 9 is a schematic structural diagram illustrating a device for imaging controlling according to an implementation of the present disclosure.

As illustrated in FIG. 9, the device 100 for imaging controlling includes a determining module 110, a shooting module 120, and a processing module 130.

The determining module 110 is configured to determine a same-exposure image ratio according to ambient brightness of a shooting scene, where the same-exposure image ratio is a ratio of the number of images to be captured with same exposure among multiple images to be captured to the number of the multiple images to be captured, and the same-exposure image ratio is inversely proportional to the ambient brightness.

The shooting module 120 is configured to capture the multiple images that satisfy the same-exposure image ratio.

The processing module 130 is configured to perform a synthesizing processing on the multiple images.

In an implementation, the determining module 110 further includes an obtaining unit, a first determining unit, and a second determining unit.

The obtaining unit is configured to obtain an ISO value or AEC offset value for capturing a preview image in the shooting scene.

The first determining unit is configured to determine a brightness level of the shooting scene according to the ISO value or the AEC offset value.

The second determining unit is configured to determine the same-exposure image ratio according to the brightness level.

In an implementation, the second determining unit is configured to determine that the same-exposure image ratio is smaller than or equal to a first ratio predetermined on condition that the brightness level of the shooting scene is a high brightness level, determine that the same-exposure image ratio is larger than or equal to a second ratio predetermined on condition that the brightness level of the shooting scene is a low brightness level, and determine that the same-exposure image ratio is smaller than the second ratio and larger than the first ratio on condition that the brightness level of the shooting scene is a medium brightness level, where the first ratio is smaller than the second ratio.

The first ratio is determined according to a same-exposure image ratio that is for a condition in which exposures for capturing the multiple images are different from each other. The second ratio is determined according to a same-exposure image ratio that is for a condition in which among the multiple images exposure for capturing at least one image is different from exposures for capturing the remaining images.

In an implementation, the device 100 for imaging controlling further includes a first determining module configured to determine that the shooting scene is a medium-high dynamic-range scene with an exposure ratio larger than an exposure-ratio threshold according to an exposure ratio of exposure time of a long-exposure pixel to exposure time of a short-exposure pixel used for capturing a preview image in the shooting scene.

In an implementation, the device 100 for imaging controlling further includes an outputting module, a calculating module, and a generating module.

The outputting module is configured to control exposure of the pixel-unit array with exposure corresponding to a currently to-be-captured image to output multiple pieces of original pixel information, when capturing each image to obtain the multiple images.

The calculating module is configured to obtain synthesized pixel information corresponding to each photosensitive pixel unit according to original pixel information of the long-exposure pixel in each photosensitive pixel unit, original pixel information of a medium-exposure pixel in each photosensitive pixel unit, and original pixel information of the short-exposure pixel in each photosensitive pixel unit.

The generating module is configured to generate a corresponding image according to the synthesized pixel information corresponding to each photosensitive pixel unit.

According to the device for imaging controlling in the implementation of the present disclosure, the same-exposure image ratio is determined according to the ambient brightness of the shooting scene. The same-exposure image ratio refers to the ratio of the number of the images to be captured with same exposure among the multiple images to be captured to the number of the multiple images to be captured, and the same-exposure image ratio is inversely proportional to the ambient brightness. The multiple images that satisfy the same-exposure image ratio are captured. The synthesizing processing is performed on the multiple images. Therefore, according to the ambient brightness of the shooting scene, shooting is determined to be performed according to the same-exposure image ratio to obtain the multiple images, and then the multiple mages are synthesized to obtain an image, and thus not only noise of the image is reduced and a dynamic range of the image is improved, but also a relatively good shooting effect is provided and user's experience is improved.

What needs to be illustrated is that illustration of the above-mentioned method for imaging controlling can also be applied to the device for imaging controlling in the implementation, which will not be repeated herein.

To realize the above implementations, the present disclosure further provides an electronic device. The electronic device includes a memory, a processor, and at least one computer program stored in the memory and capable of being run in the processor. The processor executes the computer program to perform the method for imaging controlling in the above-mentioned implementation.

To realize the above-mentioned implementations, the present disclosure further provides a non-transitory computer-readable storage medium storing at least one computer program. The at least one computer program, when executed by a processor, is operable with the processor to perform the method for imaging controlling in the above-mentioned implementation.

Figure 10:
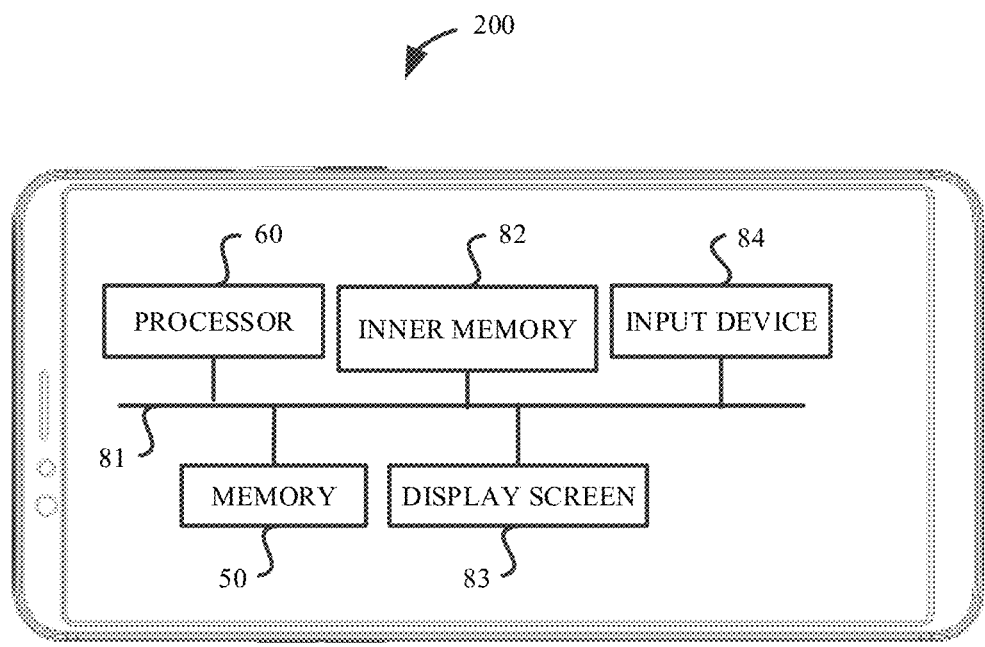
FIG. 10 is a schematic block diagram illustrating an electronic device according to implementations of the present disclosure.

As illustrated in FIG. 10, the present disclosure further provides an electronic device 200. The electronic device 200 includes a memory 50 and a processor 60. The memory 50 stores at least one computer-readable instruction. The computer-readable instruction, when executed by the processor 60, is operable with the processor 60 to perform the method for imaging controlling in the above-mentioned implementation.

FIG. 10 is a schematic structural diagram illustrating an internal structure of the electronic device 200 in an implementation. The electronic device 200 includes the processor 60, the memory 50 (for example, a non-volatile storage medium), an internal memory 82, a display screen 83, and an input device 84 that are coupled together via a system bus 81. The memory 50 of the electronic device 200 stores an operating system and computer readable instructions. The computer-readable instructions can be executed by the processor 60 to implement the method for imaging controlling in the implementations of the present disclosure. The processor 60 is configured to provide calculation and control capabilities, to support the operation of the electronic device 200. The internal memory 82 of the electronic device 200 provides an environment for the execution of the computer readable instructions in the memory 50. The display screen 83 of the electronic device 200 may be a liquid crystal display screen, an electronic ink display screen, or the like, and the input device 84 may be a touch layer on the display screen 83, or may be a button, a trackball or a touch panel disposed on a housing of the electronic device 200, and may also be an external keyboard, touchpad, mouse, or the like. The electronic device 200 may be a mobile phone, a tablet computer, a notebook computer, a personal digital assistant (PDA), or a wearable device (such as a smart bracelet, a smart watch, a smart helmet, and a pair of smart glasses). Those skilled in the art can understand that the structure illustrated in FIG. 10 is merely a schematic structure related to the solution of the present disclosure, and does not constitute a limitation on the electronic device 200 that can provide the solution of the present disclosure. The electronic device 200 may include more or fewer components than illustrated in FIG. 10, or a combination of certain components, or have a different component arrangement.

Figure 11:
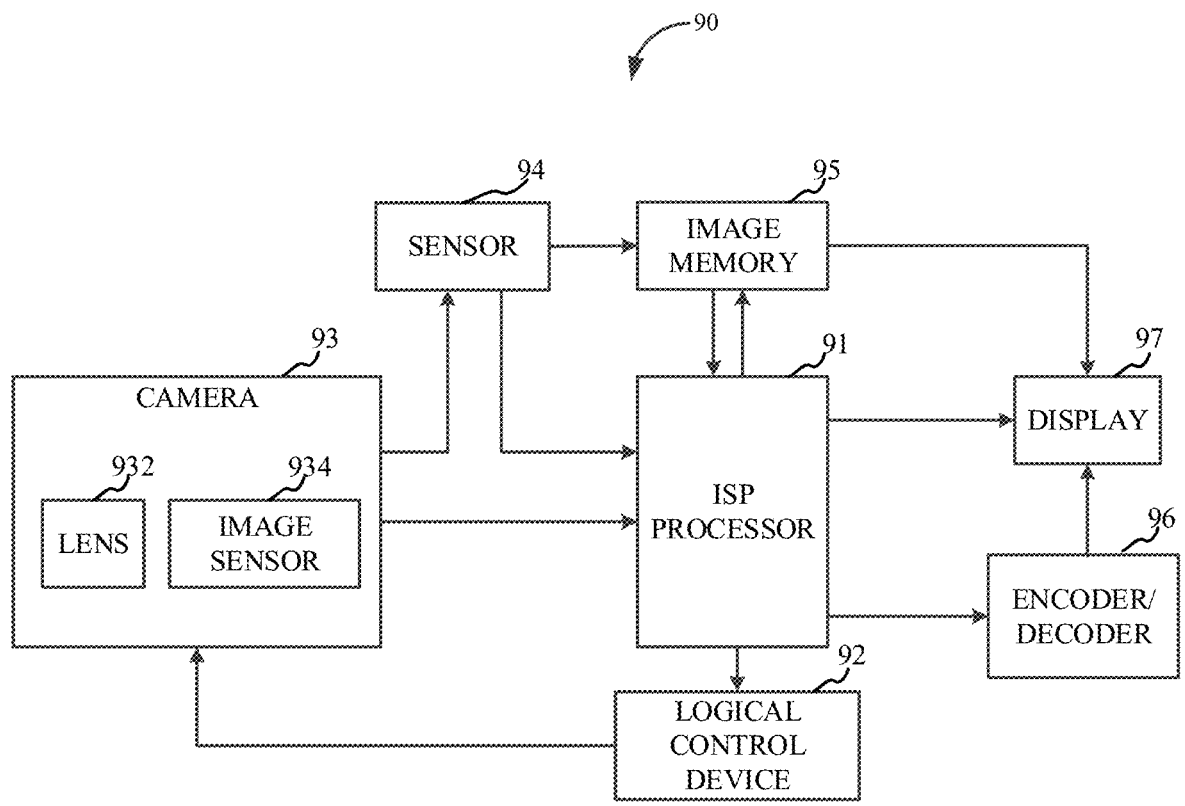
FIG. 11 is a schematic block diagram illustrating an image processing circuit according to implementations of the present disclosure.

Referring to FIG. 11, the electronic device 200 in the implementation of the present disclosure includes an image processing circuit 90. The image processing circuit 90 can be implemented by hardware and/or software components, including various processing units defining image signal processing (ISP) pipelines. FIG. 11 is a schematic diagram illustrating the image processing circuit 90 in an implementation. As illustrated in FIG. 11, for ease of description, only various aspects of the image processing technology related to the implementation of the present disclosure are illustrated.

As illustrated in FIG. 11, the image processing circuit 90 includes an ISP processor 91 (the ISP processor 91 may be the processor 60) and a logical control device 92. Image data captured by the camera 93 is first processed by the ISP processor 91, and the ISP processor 91 analyzes the image data to obtain image statistical information that can be used to determine one or more control parameters of the camera 93. The camera 93 may include one or more lenses 932 and an image sensor 934. The image sensor 934 may include a color filter array (such as a Bayer filter). The image sensor 934 can obtain light intensity and wavelength information captured by each imaging pixel, and provide a set of raw image data that can be processed by the ISP processor 91. The sensor 94 (such as a gyroscope sensor) can provide the collected image processing parameters (such as anti-shake parameters) to the ISP processor 91 based on a type of an interface of the sensor 94. The interface of the sensor 94 may be a standard mobile imaging architecture (SMIA) interface, other serial or parallel camera interface, or a combination of the above interfaces.

In addition, the image sensor 934 can also send the raw image data to the sensor 94. The sensor 94 can provide the raw image data to the ISP processor 91 based on the type of the interface of the sensor 94, or the sensor 94 can store the raw image data in an image memory 95.

The ISP processor 91 processes the raw image data pixel by pixel in multiple formats. For example, each image pixel may have a bit depth of 8, 10, 12, or 14 bits, and the ISP processor 91 can perform one or more image processing operations on the raw image data and collect statistical information about the image data. The image processing operations can be performed with the same or different bit depth accuracies.

The ISP processor 91 can also receive image data from the image memory 95. For example, the interface of the sensor 94 sends the raw image data to the image memory 95, and the raw image data in the image memory 95 is then provided to the ISP processor 91 for processing. The image memory 95 may be the memory 50, a part of the memory 50, a storage device, or an independent dedicated memory in the electronic device, and may include direct memory access (DMA) features.

When receiving the raw image data from the interface of the image sensor 934 or the interface of the sensor 94 or the image memory 95, the ISP processor 91 can perform one or more image processing operations, such as temporal filtering. The processed image data can be sent to the image memory 95 for additional processing before being displayed. The ISP processor 91 receives the processed data from the image memory 95, and performs image data processing on the processed data in the original domain and the RGB and YCbCr color spaces. The image data processed by the ISP processor 91 can be output to a display 97 (the display 97 may include the display screen 83) for viewing by a user and/or further processing by a graphics engine or a graphics processing unit (GPU). In addition, the output of the ISP processor 91 can also be sent to the image memory 95, and the display 97 can read image data from the image memory 95. In one implementation, the image memory 95 may be configured to implement one or more frame buffers. In addition, the output of the ISP processor 91 may be sent to an encoder/decoder 96 in order to encode/decode image data. The encoded image data can be stored and decompressed before being displayed on the display 97. The encoder/decoder 96 may be implemented by a central processing unit (CPU) or GPU or a coprocessor.

The statistical data determined by the ISP processor 91 can be sent to the logical control device 92. For example, the statistical data may include statistical information of the image sensor 934, such as automatic exposure, automatic white balance, automatic focus, flicker detection, black-level compensation, and shading correction of the lens 932. The logical control device 92 may include a processing element and/or microcontroller that executes one or more routines (such as firmware), where the one or more routines can determine control parameters of the camera 93 and the ISP processor 91 based on the received statistical data. For example, the control parameters of the camera 93 may include control parameters of the sensor 94 (such as gain, integration time for exposure control, anti-shake parameters, etc.), camera-flash control parameters, control parameters of the lens 932 (such as focus or zoom focal length), or a combination thereof. The control parameters of the ISP processor 91 may include gain levels and color correction matrices for automatic white balance and color adjustment (for example, during RGB processing), and shading correction parameters of the lens 932.

The reference term "an implementation", "some implementations", "an example", "a specific example", or "some examples" referred to in the specification means that a particular feature, structure, material, or characteristic described in conjunction with the implementation or examples may be contained in at least one implementation or example of the present disclosure. In this specification, the schematic representations of the above terms are not necessary for the same implementation or example. Furthermore, the particular feature, structure, material, or characteristic described may be properly combined in any one or more implementations or examples. In addition, those skilled in the art can perform a combination on different implementations or examples and features of different implementations or examples described in this specification without mutual contradiction.

In addition, terms "first", "second", and the like are only used for description and cannot be understood as explicitly or implicitly indicating relative importance or implicitly indicating the number of technical features referred to herein. Therefore, features restricted by the terms "first", "second", and the like can explicitly or implicitly include at least one of the features. In the context of the present disclosure, unless stated otherwise, "multiple", "a plurality of", or "a number of" refers to "at least two", such as two, three, and the like.

Any process or method illustrated in a flow chart or herein in other manners can be understood as a module, a fragment, or a portion of codes that include one or more executable instructions for implementing a particular logical function or operations of a process. The scope of the implementations of the present disclosure includes additional implementations in which the functions may be performed out of the order illustrated or discussed. For example, the involved functions can be performed in a substantially simultaneous manner or in the reverse order, which should be understood by those skilled in the art.

Logics and/or steps illustrated in the flow charts or described herein in other way, can be considered as a sequencing table of executable instructions for realizing logical functions, which can be embodied in any computer-readable medium to be used by an instruction execution system, a device, or an apparatus (e.g., a computer-based system, a system including a processor, or other systems that can read and execute an instruction from the instruction execution system, device, or apparatus), or to be used in combination with the instruction execution system, device, or apparatus. In terms of this specification, the "computer-readable medium" may be any device that includes or stores communicating programs, propagation or transmission programs used by the instruction execution system, device, or apparatus or used in combination with the instruction execution system, device or, apparatus. In particular, the computer-readable medium (illustrated in a non-exhaustive list) may include: an electrical connection part (electronic device) having one or more wires, a portable computer disk cartridge (magnetic device), a random access memory (RAM), a read-only memory (ROM), an erasable programmable read-only memory (EPROM or flash memory), an optical fiber device, and a portable compact disc read-only memory (CDROM). In addition, the computer-readable medium even can be a paper or other appropriate medium on which the programs are printed, where the programs can be electronically obtained as follows. An optical scanning is conducted on the paper or other medium, followed by editing, interpreting, or processing in other appropriate mode. The programs are stored in a computer memory.

It should be understood that all parts of the implementations can be realized via hardware, software, firmware, or a combination thereof. In the above implementations, multiple operations or methods can be implemented by software or firmware that is stored in a memory and executed by a proper instruction execution system. For example, if the multiple operations or methods are implemented by hardware, as in another implementation, the multiple operations or methods can be implemented with any of the following technologies or a combination thereof known in the art: a discrete logic circuit with a logic gate circuit for realizing logic functions on data signals, a dedicated integrated circuit with an appropriate combined logic gate circuit, a programmable gate array (PGA), a field programmable gate array (FPGA), and so on.

It should be understood by those of ordinary skill in the art that all or part of operations of the method of the above implementations can be implemented by instructing relevant hardware via a program, the program can be stored in a computer-readable storage medium, and when the program is executed, one of operations or a combination of the operations of the method implementations is executed.

Moreover, the functional units in the implementations may be integrated in one processing module, or the units separately and physically exist, or two or more units are integrated in one module. The above-mentioned integrated module may be realized in the form of hardware or a software functional module. When the integrated module is realized in the form of a software functional module and sold or used as an independent product, it can also be stored in the computer-readable storage medium.

The aforementioned storage medium may be a ROM, a magnetic disc, an optical disc, or the like.

Although the implementations of the present disclosure are illustrated and described above, it should be understood that the implementations are exemplary rather than limiting the present disclosure. Various changes, modifications, substitutions, and variations could be made to the implementations by those of ordinary skilled in the art within the scope of the disclosure.

What is claimed is:

1. A method for imaging controlling, comprising:
    determining a same-exposure image ratio according to ambient brightness of a shooting scene, wherein the same-exposure image ratio is a ratio of the number of images to be captured with same exposure among a plurality of images to be captured to the number of the plurality of images to be captured, and the same-exposure image ratio is inversely proportional to the ambient brightness;
    capturing the plurality of images that satisfy the same-exposure image ratio; and
    performing a synthesizing processing on the plurality of images.

2. The method for imaging controlling of claim 1, wherein determining the same-exposure image ratio according to the ambient brightness of the shooting scene comprises:
    obtaining an International Organization for Standardization (ISO) value or automatic exposure control (AEC) offset value for capturing a preview image in the shooting scene;
    determining a brightness level of the shooting scene according to the ISO value or the AEC offset value; and
    determining the same-exposure image ratio according to the brightness level.

3. The method for imaging controlling of claim 2, wherein the brightness level is a low brightness level, a medium brightness level, or a high brightness level, wherein brightness corresponding to the low brightness level is lower than that corresponding to the medium brightness level, and the brightness corresponding to the medium brightness level is lower than that corresponding to the high brightness level;

determining the same-exposure image ratio according to the brightness level comprises:

determining that the same-exposure image ratio is smaller than or equal to a first ratio predetermined, on condition that the brightness level of the shooting scene is the high brightness level;

determining that the same-exposure image ratio is larger than or equal to a second ratio predetermined, on condition that the brightness level of the shooting scene is the low brightness level; and determining that the same-exposure image ratio is smaller than the second ratio and larger than the first ratio, on condition that the brightness level of the shooting scene is the medium brightness level, wherein the first ratio is smaller than the second ratio.

4. The method for imaging controlling of claim 3, wherein the first ratio is determined according to a same-exposure image ratio that is for a condition in which exposures for capturing the plurality of images are different from each other; and the second ratio is determined according to a same-exposure image ratio that is for a condition in which among the plurality of images exposure for capturing at least one image is different from exposures for capturing the remaining images.

5. The method for imaging controlling of claim 1, wherein the method for imaging controlling is applied to an electronic device, the electronic device comprises a pixel-unit array, the pixel-unit array comprises a plurality of photosensitive pixel units, and each of the plurality of photosensitive pixel units comprises at least one long-exposure pixel, at least one medium-exposure pixel, and at least one short-exposure pixel;

the method further comprises:

prior to determining the same-exposure image ratio according to the ambient brightness of the shooting scene:

determining whether the shooting scene is a medium-high dynamic-range scene with an exposure ratio larger than an exposure-ratio threshold, according to an exposure ratio of exposure time of the at least one long-exposure pixel to exposure time of the at least one short-exposure pixel used for capturing a preview image in the shooting scene;

determining the same-exposure image ratio according to the ambient brightness of the shooting scene comprises:

determining the same-exposure image ratio according to the ambient brightness of the shooting scene in response to determining that the shooting scene is the medium-high dynamic-range scene.

6. The method for imaging controlling of claim 5, wherein capturing each of the plurality of images comprises:

controlling exposure of the pixel-unit array with exposure corresponding to a currently to-be-captured image to output a plurality of pieces of original pixel information of each photosensitive pixel unit, when capturing each image to obtain the plurality of images, wherein the plurality of pieces of original pixel information of each photosensitive pixel unit comprise original pixel information of the at least one long-exposure pixel in each photosensitive pixel unit, original pixel information of the at least one medium-exposure pixel in each photosensitive pixel unit, and original pixel information of the at least one short-exposure pixel in each photosensitive pixel unit;

obtaining synthesized pixel information corresponding to each photosensitive pixel unit according to the plurality of pieces of original pixel information of each photosensitive pixel unit; and generating a corresponding image according to the synthesized pixel information corresponding to each photosensitive pixel unit.

7. The method for imaging controlling of claim 6, wherein obtaining the synthesized pixel information corresponding to each photosensitive pixel unit according to the plurality of pieces of original pixel information of each photosensitive pixel unit comprises:

obtaining the synthesized pixel information corresponding to each photosensitive pixel unit by calculating an average value of the plurality of pieces of original pixel information of each photosensitive pixel unit, wherein each photosensitive pixel unit corresponds to one piece of synthesized pixel information.

8. The method for imaging controlling of claim 5, wherein determining the same-exposure image ratio according to the ambient brightness of the shooting scene comprises:

determining the same-exposure image ratio according to the ambient brightness of the shooting scene, in response to determining that the shooting scene is a low-dynamic-range scene with an exposure ratio smaller than or equal to the exposure-ratio threshold according to the exposure ratio of the exposure time of the at least one long-exposure pixel to the exposure time of the at least one short-exposure pixel used for capturing the preview image in the shooting scene.

9. The method for imaging controlling of claim 8, wherein capturing each of the plurality of images comprises:

controlling the pixel-unit array to output a plurality of pieces of original pixel information of each photosensitive pixel unit, wherein the plurality of pieces of original pixel information of each photosensitive pixel unit comprise original pixel information of the at least one long-exposure pixel in each photosensitive pixel unit, original pixel information of the at least one medium-exposure pixel in each photosensitive pixel unit, and original pixel information of the at least one short-exposure pixel in each photosensitive pixel unit;

obtaining synthesized pixel information corresponding to each photosensitive pixel unit according to the plurality of pieces of original pixel information of each photosensitive pixel unit; and performing imaging according to restored pixel information corresponding to the synthesized pixel information corresponding to each photosensitive pixel unit.

10. An electronic device comprising:

a memory configured to store at least one computer program; and a processor;

the at least one computer program, when executed, being operable with the processor to:

determine a same-exposure image ratio according to ambient brightness of a shooting scene, wherein the same-exposure image ratio is a ratio of the number of images to be captured with same exposure among a plurality of images to be captured to the number of the plurality of images to be captured, and the same-exposure image ratio is inversely proportional to the ambient brightness;

capture the plurality of images that satisfy the same-exposure image ratio; and
perform a synthesizing processing on the plurality of images.

11. The electronic device of claim 10, wherein the at least one computer program operable with the processor to determine the same-exposure image ratio according to the ambient brightness of the shooting scene is operable with the processor to:
obtain an International Organization for Standardization (ISO) value or automatic exposure control (AEC) offset value for capturing a preview image in the shooting scene;
determine a brightness level of the shooting scene according to the ISO value or the AEC offset value; and
determine the same-exposure image ratio according to the brightness level.

12. The electronic device of claim 11, wherein the brightness level is a low brightness level, a medium brightness level, or a high brightness level, wherein brightness corresponding to the low brightness level is lower than that corresponding to the medium brightness level, and the brightness corresponding to the medium brightness level is lower than that corresponding to the high brightness level;
the at least one computer program operable with the processor to determine the same-exposure image ratio according to the brightness level is operable with the processor to:
determine that the same-exposure image ratio is smaller than or equal to a first ratio predetermined, on condition that the brightness level of the shooting scene is the high brightness level;
determine that the same-exposure image ratio is larger than or equal to a second ratio predetermined, on condition that the brightness level of the shooting scene is the low brightness level; and
determine that the same-exposure image ratio is smaller than the second ratio and larger than the first ratio, on condition that the brightness level of the shooting scene is the medium brightness level, wherein the first ratio is smaller than the second ratio.

13. The electronic device of claim 12, wherein
the first ratio is determined according to a same-exposure image ratio that is for a condition in which exposures for capturing the plurality of images are different from each other; and
the second ratio is determined according to a same-exposure image ratio that is for a condition in which among the plurality of images exposure for capturing at least one image is different from exposures for capturing the remaining images.

14. The electronic device of claim 10, wherein the electronic device comprises a pixel-unit array, the pixel-unit array comprises a plurality of photosensitive pixel units, and each of the plurality of photosensitive pixel units comprises at least one long-exposure pixel, at least one medium-exposure pixel, and at least one short-exposure pixel;
the at least one computer program is further operable with the processor to determine whether the shooting scene is a medium-high dynamic-range scene with an exposure ratio larger than an exposure-ratio threshold, according to an exposure ratio of exposure time of the at least one long-exposure pixel to exposure time of the at least one short-exposure pixel used for capturing a preview image in the shooting scene, and determine the same-exposure image ratio according to the ambient brightness of the shooting scene in response to determining that the shooting scene is the medium-high dynamic-range scene.

15. The electronic device of claim 14, wherein the at least one computer program operable with the processor to capture each of the plurality of images is operable with the processor to:
control exposure of the pixel-unit array with exposure corresponding to a currently to-be-captured image to output a plurality of pieces of original pixel information of each photosensitive pixel unit, when capturing each image to obtain the plurality of images, wherein the plurality of pieces of original pixel information of each photosensitive pixel unit comprise original pixel information of the at least one long-exposure pixel in each photosensitive pixel unit, original pixel information of the at least one medium-exposure pixel in each photosensitive pixel unit, and original pixel information of the at least one short-exposure pixel in each photosensitive pixel unit;
obtain synthesized pixel information corresponding to each photosensitive pixel unit according to the plurality of pieces of original pixel information of each photosensitive pixel unit; and
generate a corresponding image according to the synthesized pixel information corresponding to each photosensitive pixel unit.

16. The electronic device of claim 15, wherein the at least one computer program operable with the processor to obtain the synthesized pixel information corresponding to each photosensitive pixel unit according to the plurality of pieces of original pixel information of each photosensitive pixel unit is operable with the processor to:
obtain the synthesized pixel information corresponding to each photosensitive pixel unit by calculating an average value of the plurality of pieces of original pixel information of each photosensitive pixel unit, wherein each photosensitive pixel unit corresponds to one piece of synthesized pixel information.

17. The electronic device of claim 14, wherein the at least one computer program operable with the processor to determine the same-exposure image ratio according to the ambient brightness of the shooting scene is operable with the processor to:
determine the same-exposure image ratio according to the ambient brightness of the shooting scene, in response to determining that the shooting scene is a low-dynamic-range scene with an exposure ratio smaller than or equal to the exposure-ratio threshold according to the exposure ratio of the exposure time of the at least one long-exposure pixel to the exposure time of the at least one short-exposure pixel used for capturing the preview image in the shooting scene.

18. The electronic device of claim 17, wherein the at least one computer program operable with the processor to capture each of the plurality of images is operable with the processor to:
control the pixel-unit array to output a plurality of pieces of original pixel information of each photosensitive pixel unit, wherein the plurality of pieces of original pixel information of each photosensitive pixel unit comprise original pixel information of the at least one long-exposure pixel in each photosensitive pixel unit, original pixel information of the at least one medium-exposure pixel in each photosensitive pixel unit, and original pixel information of the at least one short-exposure pixel in each photosensitive pixel unit;

obtain synthesized pixel information corresponding to each photosensitive pixel unit according to the plurality of pieces of original pixel information of each photosensitive pixel unit; and perform imaging according to restored pixel information corresponding to the synthesized pixel information corresponding to each photosensitive pixel unit.

19. A non-transitory computer-readable storage medium, being configured to store at least one computer program;

the at least one computer program, when executed, being operable with a processor of an electronic device to:

determine a same-exposure image ratio according to ambient brightness of a shooting scene, wherein the same-exposure image ratio is a ratio of the number of images to be captured with same exposure among a plurality of images to be captured to the number of the plurality of images to be captured, and the same-exposure image ratio is inversely proportional to the ambient brightness;

capture the plurality of images that satisfy the same-exposure image ratio; and perform a synthesizing processing on the plurality of images.

20. The non-transitory computer-readable storage medium of claim 19, wherein the at least one computer program operable with the processor to determine the same-exposure image ratio according to the ambient brightness of the shooting scene is operable with the processor to:

obtain an International Organization for Standardization (ISO) value or automatic exposure control (AEC) offset value for capturing a preview image in the shooting scene;

determine a brightness level of the shooting scene according to the ISO value or the AEC offset value; and determine the same-exposure image ratio according to the brightness level.

* * * * *